US012515667B2

(12) United States Patent
Umezawa et al.

(10) Patent No.: US 12,515,667 B2
(45) Date of Patent: Jan. 6, 2026

(54) DRIVING ASSISTANCE APPARATUS FOR VEHICLE (71) Applicant: SUBARU CORPORATION, Tokyo (JP)

(72) Inventors: Katsuyuki Umezawa, Tokyo (JP); Hiroaki Kuramochi, Tokyo (JP); Satoshi Nakano, Tokyo (JP); Masashi Okano, Tokyo (JP); Shuhei Dairokuno, Tokyo (JP); Motohiro Hidaka, Tokyo (JP); Tatsuro Suzuki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 266 days.

(21) Appl. No.: 18/224,192

(22) Filed: Jul. 20, 2023

(65) Prior Publication Data
US 2024/0034319 A1 Feb. 1, 2024

(30) Foreign Application Priority Data

Jul. 29, 2022 (JP) ................. 2022-121718

(51) Int. Cl.
B60W 30/18 (2012.01)
B60W 40/10 (2012.01)
B60W 60/00 (2020.01)

(52) U.S. Cl.
CPC ...... B60W 30/18154 (2013.01); B60W 40/10 (2013.01); B60W 60/001 (2020.02); B60W 2554/801 (2020.02)

(58) Field of Classification Search
CPC .......... B60W 30/18154; B60W 40/10; B60W 2554/801; B60W 50/14; B60W 2556/50;
(Continued)

(56) References Cited

U.S. PATENT DOCUMENTS

2015/0274163 A1* 10/2015 Terazawa .............. B60W 10/20
701/41
2017/0010618 A1* 1/2017 Shashua ............ B60W 60/0015
(Continued)

FOREIGN PATENT DOCUMENTS

JP 2021160625 A * 10/2021

Primary Examiner — Khoi H Tran
Assistant Examiner — Tristan J Greiner
(74) Attorney, Agent, or Firm — TROUTMAN PEPPER LOCKE LLP (57) ABSTRACT A driving assistance apparatus for a vehicle includes: an environment information acquisitor that acquires environment information ahead of the vehicle; a vehicle position estimator that estimates a vehicle's position; a target route setter that sets a target route; and a controller that causes the vehicle to travel along the target route. The controller includes: an intersection determiner that determines whether an intersection is ahead of the vehicle; a right-left turn determiner that determines whether the vehicle turns right or left at the intersection; a route generator that generates correct and erroneous routes; a lateral position distance calculator that calculates a correct-route-side lateral position distance and an erroneous-route-side lateral position distance; a lateral position distance comparator that compares the lateral position distances; a control determination comparator that compares the correct-route-side lateral position distance with a threshold; and an intervention controller that returns a traveling direction to the correct route side.

10 Claims, 10 Drawing Sheets

(58) Field of Classification Search
CPC ....... B60W 60/0011; B60W 30/18145; B60W 30/18159; B60W 40/00; B60W 50/0098
See application file for complete search history.

(56) References Cited

U.S. PATENT DOCUMENTS

2017/0267286 A1* 9/2017 Takamatsu ............ B60W 30/12
2018/0257660 A1* 9/2018 Ibrahim ................ G01S 5/0027
2019/0212744 A1* 7/2019 Milstein ............... G05D 1/0217

* cited by examiner

DRIVING ASSISTANCE APPARATUS FOR VEHICLE

CROSS-REFERENCE TO RELATED APPLICATION

The present application claims priority from Japanese Patent Application No. 2022-121718 filed on Jul. 29, 2022, the entire contents of which are hereby incorporated by reference.

BACKGROUND

The disclosure relates to a driving assistance apparatus for a vehicle that performs intervention control of generating a correct route and an erroneous route in an intersection when a vehicle turns right or left in the intersection, and returning the route to the correct route side when the vehicle is traveling on the erroneous route side.

In this type of driving assistance apparatus, when a driver (operator) who drives the vehicle sets a destination, a travel route from a current location to the destination is set on a road map, and driving of all or a part of the traveling route is assisted, or the driving is automatically performed instead of the driver. In driving assistance, a target route along which the vehicle travels is set on a travel route ahead of the vehicle. Then, a position where the vehicle is actually traveling is acquired from a sensing device or the like represented by a camera, a deviation amount of the vehicle position (vehicle lateral position) with respect to the target route is measured, and a steering angle is feedback-controlled so that the deviation amount converges to the target route (deviation amount=0).

In the driving assistance on an ordinary road, when the traveling route of the vehicle is set in a direction of turning right or left at an intersection, a control unit acquires road information (position information, lane width information, or the like) in the direction of turning right or left from a road map database. Then, the control unit sets the target route for turning right or left at the intersection from the current vehicle based on the current position information of the vehicle (vehicle position information) before the intersection and road information of a right turn or left turn destination acquired from the road map database.

For example, Japanese Unexamined Patent Application Publication No. 2021-160625 discloses a technology in which a target route is set by coupling a center line set to a lane before an intersection on which a vehicle is traveling and a center line set to a lane to which a left turn is made with a clothoid curve set in the intersection, and the vehicle is caused to travel along the target route.

SUMMARY

An aspect of the disclosure provides a driving assistance apparatus for a vehicle. The driving assistance apparatus includes an environment information acquisitor, a vehicle position estimator, a target route setter, and a controller. The environment information acquisitor is configured to acquire environment information in front of the vehicle. The vehicle position estimator is configured to estimate a position of the vehicle on a road. The target route setter is configured to set a target route for the vehicle. The controller is configured to cause the vehicle to travel along the target route. The controller includes an intersection determiner, a right-left turn determiner, a route generator, a lateral position distance calculator, a lateral position distance comparator, a control determination comparator, and an intervention controller. The intersection determiner is configured to determine whether there is an intersection in front of the vehicle based on the environment information acquired by the environment information acquisitor. The right-left turn determiner is configured to determine whether the vehicle turns right or left at the intersection when the intersection determiner determines that there is the intersection. The route generator is configured to, when the right-left turn determiner determines that the vehicle turns right or left, generate a correct route and an erroneous route at the intersection before the vehicle enters the intersection. The correct route is coupled to the target route generated at a destination of a right turn or a left turn. The erroneous route is coupled to an opposite lane of the destination of the right turn or the left turn. The lateral position distance calculator is configured to calculate a correct-route-side lateral position distance from the position of the vehicle to the correct route in a vehicle width direction of the vehicle and an erroneous-route-side lateral position distance from the position of the vehicle to the erroneous route in the vehicle width direction. The lateral position distance comparator is configured to compare the correct-route-side lateral position distance and the erroneous-route-side lateral position distance. The control determination comparator is configured to compare the correct-route-side lateral position distance with a preset intervention threshold value when the lateral position distance comparator determines that the correct-route-side lateral position distance is longer than the erroneous-route-side lateral position distance. The intervention controller is configured to execute loose intervention control when the control determination comparator determines that the correct-route-side lateral position distance is shorter than the intervention threshold value. The intervention controller is configured to, when the control determination comparator determines that the correct-route-side lateral position distance is longer than the intervention threshold value, execute strong intervention control to return a traveling direction of the vehicle to a side of the correct route.

An aspect of the disclosure provides a driving assistance apparatus for a vehicle. The driving assistance apparatus includes circuitry. The circuitry is configured to acquire environment information in front of the vehicle. The circuitry is configured to estimate a position of the vehicle on a road. The target circuitry is configured to set a target route for the vehicle. The circuitry is configured to cause the vehicle to travel along the target route. The circuitry is configured to determine whether there is an intersection in front of the vehicle based on the environment information. The circuitry is configured to, upon determining that there is the intersection, determine whether the vehicle turns right or left at the intersection. The circuitry configured to, upon determining that the vehicle turns right or left, generate a correct route and an erroneous route at the intersection before the vehicle enters the intersection. The correct route is coupled to the target route generated at a destination of a right turn or a left turn. The erroneous route is coupled to an opposite lane of the destination of the right turn or the left turn. The circuitry is configured to calculate a correct-route-side lateral position distance from the position of the vehicle to the correct route in a vehicle width direction of the vehicle and an erroneous-route-side lateral position distance from the position of the vehicle to the erroneous route in the vehicle width direction. The circuitry is configured to compare the correct-route-side lateral position distance and the erroneous-route-side lateral position distance. The circuitry is configured to, upon determining that the correct-routeside lateral position distance is longer than the erroneous-route-side lateral position distance, compare the correct-route-side lateral position distance with a preset intervention threshold value. The circuitry is configured to, upon determining that the correct-route-side lateral position distance is shorter than the intervention threshold value, execute loose intervention control. The circuitry is configured to, upon determining that the correct-route-side lateral position distance is longer than the intervention threshold value, execute strong intervention control to return a traveling direction of the vehicle to a side of the correct route.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

In the technology related to driving assistance disclosed in the above-described document, the vehicle is caused to travel along the target route set at the intersection, but the curvature of the target route set in the intersection is relatively large, and thus the vehicle is caused to turn at a large steering angle. However, turning characteristics of the vehicle at the time of traveling are different for each vehicle type, and it is conceivable that the vehicle turns in a state of being clearly deviated from the target route depending on the vehicle. When the deviation amount from the target route is large, it is difficult to return to the target route in the intersection even if the steering angle is feedback-controlled.

Consequently, when the vehicle passes through the intersection and enters a lane of a right turn or left turn destination, the vehicle greatly deviates from the target route and enters, and thus there is a disadvantage that traveling stability is impaired. Therefore, when turning right or left at an intersection, there is a limit to executing driving assistance for causing the vehicle to appropriately enter the lane of the right turn or left turn destination only by the conventional uniform feedback control on the target route.

It is desirable to provide a driving assistance apparatus for a vehicle capable of performing appropriate intervention control depending on a vehicle position in an intersection when turning right or left at the intersection.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
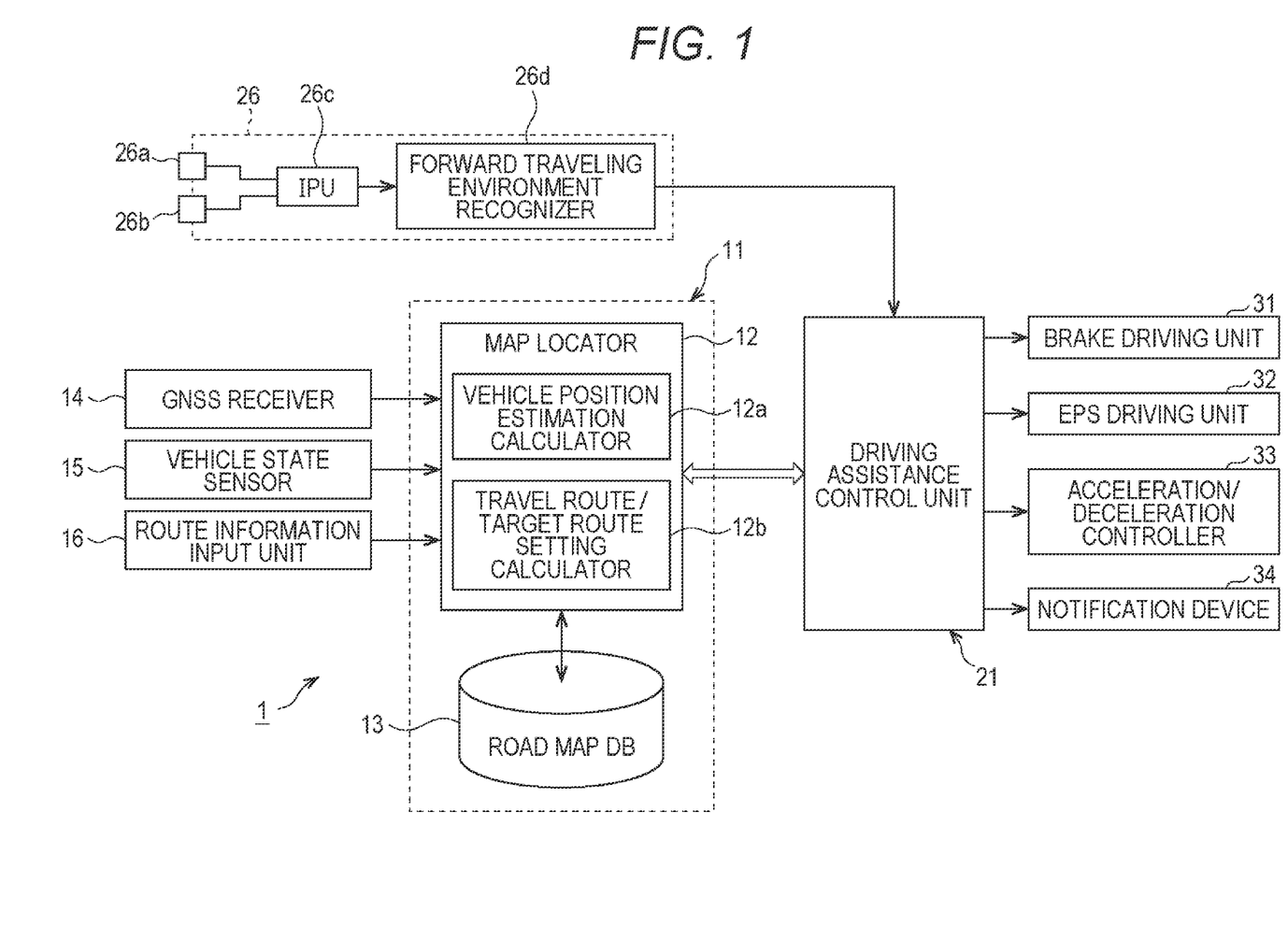
FIG. 1 is a schematic configuration diagram of a driving assistance apparatus.

A vehicle M (see FIG. 6) is equipped with a driving assistance apparatus 1 for performing autonomous traveling in an automated driving section (a specific section of an expressway or a general road, or the like) without depending on the operation of the driver who drives the vehicle. The driving assistance apparatus 1 includes a locator unit 11 and a driving assistance control unit 21 as a controller. Furthermore, the locator unit 11 is provided with a map locator calculator 12 and a road map database 13.

The map locator calculator 12, the driving assistance control unit 21, and a forward traveling environment recognizer 26d provided in a camera unit 26 to be described later are configured by a microcontroller including a CPU, a RAM, a ROM, a rewritable nonvolatile memory (a flash memory or an EEPROM), and peripheral devices. The ROM stores programs, fixed data, and the like necessary for causing the CPU to execute each process. The RAM is provided as a work area of the CPU, and temporarily stores various data in the CPU. Note that the CPU is also called a microprocessor (MPU) or a processor. In addition, a graphics processing unit (GPU) or a graph streaming processor (GSP) may be used instead of the CPU. Alternatively, the CPU, the GPU, and the GSP may be selectively combined and used.

Furthermore, a global navigation satellite system (GNSS/global positioning satellite system) receiver 14, a vehicle state sensor 15, and a route information input unit 16 are coupled to an input side of the map locator calculator 12.

The vehicle state sensor 15 detects a traveling state of the vehicle M, and is a generic term for a vehicle speed sensor, a yaw rate sensor, a longitudinal acceleration sensor, a turn signal switch, and the like. The route information input unit 16 is a terminal device operated by an occupant (mainly the driver), and can receive a series of information such as a destination and a waypoint necessary for setting a traveling route in the map locator calculator 12. For example, the route information input unit 16 is an input unit (for example, a touch panel of a monitor) of a car navigation system, a mobile terminal such as a smartphone, a personal computer, or the like, and is coupled to the map locator calculator 12 in a wired or wireless manner.

When the occupant inputs information of a destination and a waypoint (facility name, address, telephone number, or the like) by operating the route information input unit 16, this input information is read by the map locator calculator 12. When a destination or a waypoint is input, the map locator calculator 12 sets position coordinates (latitude, longitude, and altitude) of the destination or the waypoint.

The map locator calculator 12 includes a vehicle position estimation calculator 12a as a vehicle position estimator that estimates the current vehicle position, and a travel route/target route setting calculator 12b as a target route setter that sets a travel route from the vehicle position to a destination (and a waypoint) and a target route for causing the vehicle M to automatically travel in an automated driving section (for example, an expressway).

The road map database 13 is a mass storage medium such as an HDD, and stores known high-precision road map information (local dynamic map). The high-precision road map information stores road data used for automated driving of the vehicle M.

The vehicle position estimation calculator 12a acquires current position coordinates (latitude, longitude, and altitude) of the vehicle M based on the positioning signal received by the GNSS receiver 14, performs map matching of the position coordinates on the high-precision road map information, and estimates a vehicle position (current position) on the road map.

The travel route/target route setting calculator 12b refers to the high-precision road map information stored in the road map database 13 based on the position information (latitude, longitude, and altitude) of the vehicle position estimated by the vehicle position estimation calculator 12a and the position information (latitude, longitude, and altitude) of the input destination (and waypoint). The travel route/target route setting calculator 12b constructs a travel route coupling the vehicle position and the destination (if a waypoint is set, the destination via the waypoint) on the high-precision road map information according to preset route conditions (recommended route, fastest route, and the like).

Then, the travel route/target route setting calculator 12b sets a target route for causing the vehicle M to travel by automated driving up to several kilometers ahead of the vehicle M. The target route is set, for example, at the center of the lane on which the vehicle M travels (the center of left and right dividing lines).

The driving assistance apparatus 1 also includes the camera unit 26 that recognizes a traveling environment ahead of the vehicle M. The camera unit 26 is fixed to an upper center of a front part of the vehicle interior of the vehicle M, and includes an onboard camera (stereo camera) including a main camera 26a and a sub camera 26b disposed at symmetrical positions across the center in a vehicle width direction, an image processing unit (IPU) 26c, and a forward traveling environment recognizer 26d. In the camera unit 26, the main camera 26a captures reference image data, and the sub camera 26b captures comparison image data.

Then, both the image data are subjected to predetermined image processing by the IPU 26c. The forward traveling environment recognizer 26d reads the reference image data and the comparison image data subjected to the image processing by the IPU 26c, recognizes the same object in both images based on the parallax, calculates distance data (distance from the vehicle M to the object) using the principle of triangulation, and recognizes forward traveling environment information that is surrounding environment information of the front.

The forward traveling environment recognizer 26d of the camera unit 26 is coupled to the input side of the driving assistance control unit 21. Further, the driving assistance control unit 21 is coupled to the map locator calculator 12 via an in-vehicle communication line (for example, controller area network (CAN)) so as to be bidirectionally communicable.

On the other hand, a brake driving unit 31, an electric power steering (EPS) motor driver 32, an acceleration/deceleration controller 33, a notification device 34 such as a monitor or a speaker for notifying the driver of information for calling attention, and the like are coupled to an output side of the driving assistance control unit 21.

Here, the brake driving unit 31 decelerates the vehicle M to a predetermined speed by forced braking by driving a brake actuator (not illustrated) and adjusting brake fluid pressures supplied to wheel cylinders of respective brake calipers provided on the wheels. The EPS driving unit 32 drives an EPS motor provided in an electric power steering (EPS) device that is not illustrated to perform steering control of the vehicle M during traveling. The acceleration/deceleration controller 33 controls (engine braking or regenerative braking) a driving force of a driving source (an engine, an electric motor, or the like) and causes the vehicle speed during traveling to converge to a target vehicle speed by cooperative control with the brake driving unit 31.

Meanwhile, in the automated driving, the target route is basically set at the center of the travel lane. Thus, in the driving assistance control unit 21, even when the vehicle turns right or left at an intersection by automated driving, the target route is set at the center of the travel lane of the destination of the right turn or the left turn. Therefore, the driving assistance control unit 21 transmits a driving signal corresponding to the target steering angle at which the target route is traced to the EPS driving unit 32 (feedforward control).

In this case, the driving assistance control unit 21 calculates a steering angle correction amount that converges the deviation amount to the target route (deviation amount=0) from the deviation amount between the target route set by the map locator calculator 12 and the vehicle position (vehicle lateral position) estimated by the camera unit 26 or the vehicle position estimation calculator 12a Then, the target steering angle is corrected by the steering angle correction amount (feedback control), and the EPS driving unit 32 is driven by the corrected target steering angle.

The target route set as the travel lane of the destination of the right turn or the left turn described above is set when the vehicle M is traveling in the travel lane before the right turn or the left turn. Also when the vehicle M turns right or left at the intersection, the deviation amount with respect to the target route is calculated. A deviation amount with respect to a target route when turning right or left at an intersection tends to be relatively large. Thus, in the feedback control for correcting the deviation amount, the feedback control for converging the deviation amount to the target route is continued even on the road of the destination of the right turn or the left turn at the intersection.

The feedback control has a certain delay time, and when the deviation amount is large, it is difficult to immediately converge the deviation amount with respect to the target route because traveling stability is impaired.

This feedback control is control for converging a deviation amount to the target route, and whether an actual traveling route (vehicle traveling route) during the feedback control can pass on a road of a destination of a right turn or a left turn is not considered. Therefore, when the correction by the feedback control is insufficient, it is conceivable that the vehicle traveling route enters the opposite lane side of the right turn or left turn destination.

Thus, in the driving assistance control unit 21 according to the present embodiment, a normal target route and an erroneous route Re that enters the opposite lane side of the right turn or left turn destination are set in the intersection, it is checked what position the vehicle M is located at between the target route and the erroneous route Re, and the traveling state of the vehicle M is controlled accordingly.

Figure 2:
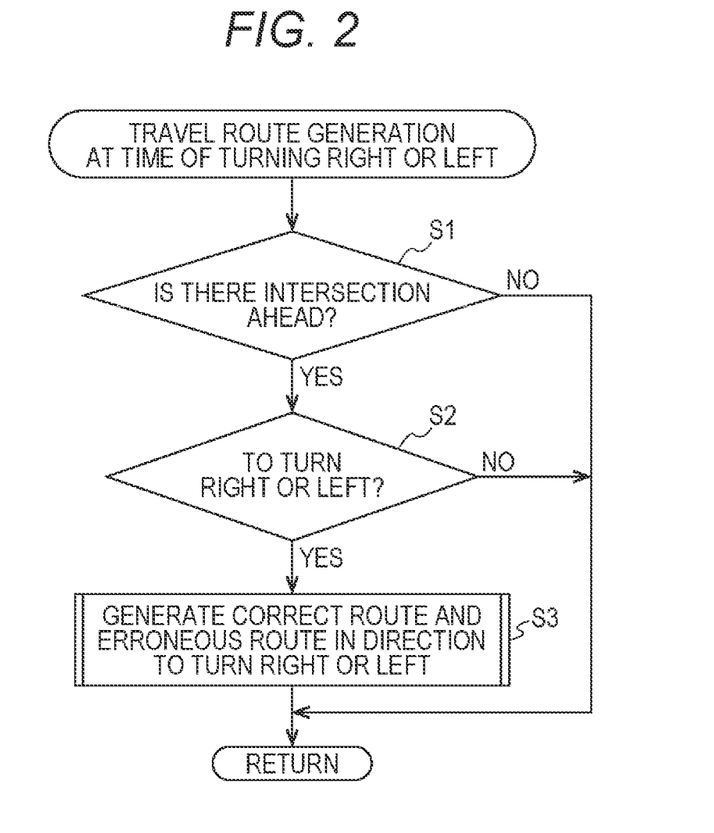
FIG. 2 is a flowchart illustrating a travel route generation routine at a time of turning right or left.

The setting of the target route and the erroneous route Re executed by the driving assistance control unit 21 is performed in accordance with, for example, a travel route generation routine at a time of turning right or left illustrated in FIG. 2. Control of the traveling state according to the vehicle position is performed in accordance with a travel assistance control routine at a time of turning right or left illustrated in FIGS. 4A and 4B. In the following, a routine of FIG. 2 will be described first, and routines illustrated in FIGS. 4A and 4B will be described next.

In the routine illustrated in FIG. 2, first, in step S1, it is checked whether there is an intersection within a predetermined distance (for example, 200 (m)) in front of the vehicle M. Whether there is an intersection is acquired from, for example, the forward traveling environment information recognized by the forward traveling environment recognizer 26d of the camera unit 26, the high-precision road map information stored in the road map database 13, or road-to-vehicle communication.

In one embodiment, the forward traveling environment recognizer 26d, the road map database 13, and the road-to-vehicle communication may serve as an "environment information acquisitor". In one embodiment, the process in step S1 may serve as a process performed by an "intersection determiner".

Then, when it is determined that there is an intersection, the process proceeds to step S2. On the other hand, when it is determined that there is no intersection, the routine is terminated.

When the process proceeds to step S2, it is checked whether the target route is generated in a direction to turn right or left at the intersection. Note that, even when the target route is set in a linear direction, it is determined that the driver intends to turn right or left when the driver turns on the blinker switch before the intersection. At that time, the target route is rerouted in a right turn or left turn direction. In one embodiment, the process in step S2 may serve as a process performed by a "right-left turn determiner".

Then, when it is determined that the vehicle M turns right or left at the intersection, the process proceeds to step S3. On the other hand, when it is determined that the vehicle M goes straight through the intersection, the routine is terminated.

When the process proceeds to step S3, a correct route Rc and the erroneous route Re are generated in a direction in which the vehicle M in the intersection turns right or left, and the routine ends. In one embodiment, the process in step S3 may serve as a process performed by a "route generator".

Figure 3:
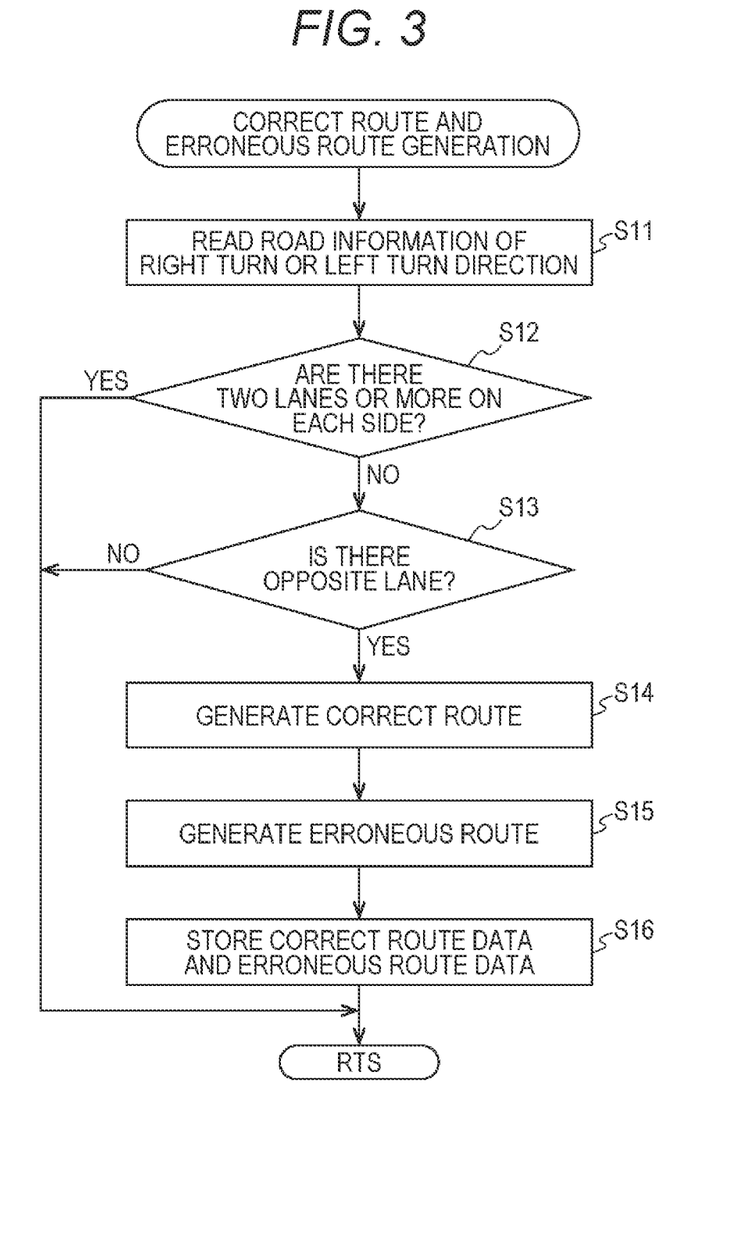
FIG. 3 is a flowchart illustrating a correct route and erroneous route generation subroutine.

The process in step S3 is executed according to a correct route and erroneous route generation subroutine illustrated in FIG. 3. In this subroutine, first, in step S11, road information ahead of the vehicle M is read. Examples of the road information include the distance from the current position of the vehicle M to the front of the intersection, the size of the intersection, the position information of a coupling end with the intersection in the right turn or left turn direction, road width information, lane number information, and the like.

This road information is acquired from, for example, the high-precision road map information stored in the road map database 13, or the road-to-vehicle communication, or the forward traveling environment information recognized by the camera unit 26. In this case, it is difficult to acquire the road information of the right turn or left turn destination from the forward traveling environment information recognized by the forward traveling environment recognizer 26d of the camera unit 26 from the current vehicle M position. Thus, it is unclear whether the target route to be generated on the road in the direction to turn right or left is correctly set with respect to the actual lane, and there is a possibility to have a large error.

Next, when the process proceeds to step S12, the driving assistance control unit 21 checks whether the road of a right turn or left turn destination includes two lanes or more on each side from the road information acquired in step S11. Then, when the number of lanes on each side is two or more, the routine is terminated. If there are two or more lanes on one side, it is considered that the vehicle M does not enter the opposite lane side even if the deviation amount of the vehicle lateral position with respect to the target route is large.

Next, the process proceeds to step S13, and the driving assistance control unit 21 checks whether there is an opposite lane on the road in the right turn or left turn direction from the road information. Then, when there is no opposite lane, the routine is terminated. On the other hand, when there is an opposite lane, the process proceeds to step S14. When there is no opposite lane, the erroneous route as described later cannot be generated and thus is excluded. When the process proceeds to step S14, the correct route Rc is generated at the intersection. As indicated by solid lines in FIGS. 6 to 9, the correct route Rc couples, in the intersection, a target route set to a lane before entering the intersection and a target route set to a lane after turning right or left at the intersection.

Therefore, the target route set in the intersection may be used as the correct route Rc. Alternatively, the correct route Rc may be generated with a curvature between two points of end points facing the intersection of a target route set to a lane before turning right or left and a target route set to a lane after turning right or left.

Thereafter, the process proceeds to step S15, and the erroneous route Re is generated. As indicated by broken lines in FIGS. 6 to 9, as the erroneous route Re, the lane width of the opposite lane of the road in the direction to turn right or left is detected from the road information acquired in step S11, and a route is generated at the center thereof. Then, the route set on the opposite lane side and an end point facing the intersection of the target route set in the lane before entering the intersection are coupled with the curvature between two points, a route is generated in the intersection, and the erroneous route Re is generated by coupling the generated routes in the intersection and the opposite lane.

Next, the process proceeds to step S16, and the data of the correct route Rc and the erroneous route Re generated in steps S14 and S15 is stored in the nonvolatile memory, and the routine is terminated.

Figure 4A:
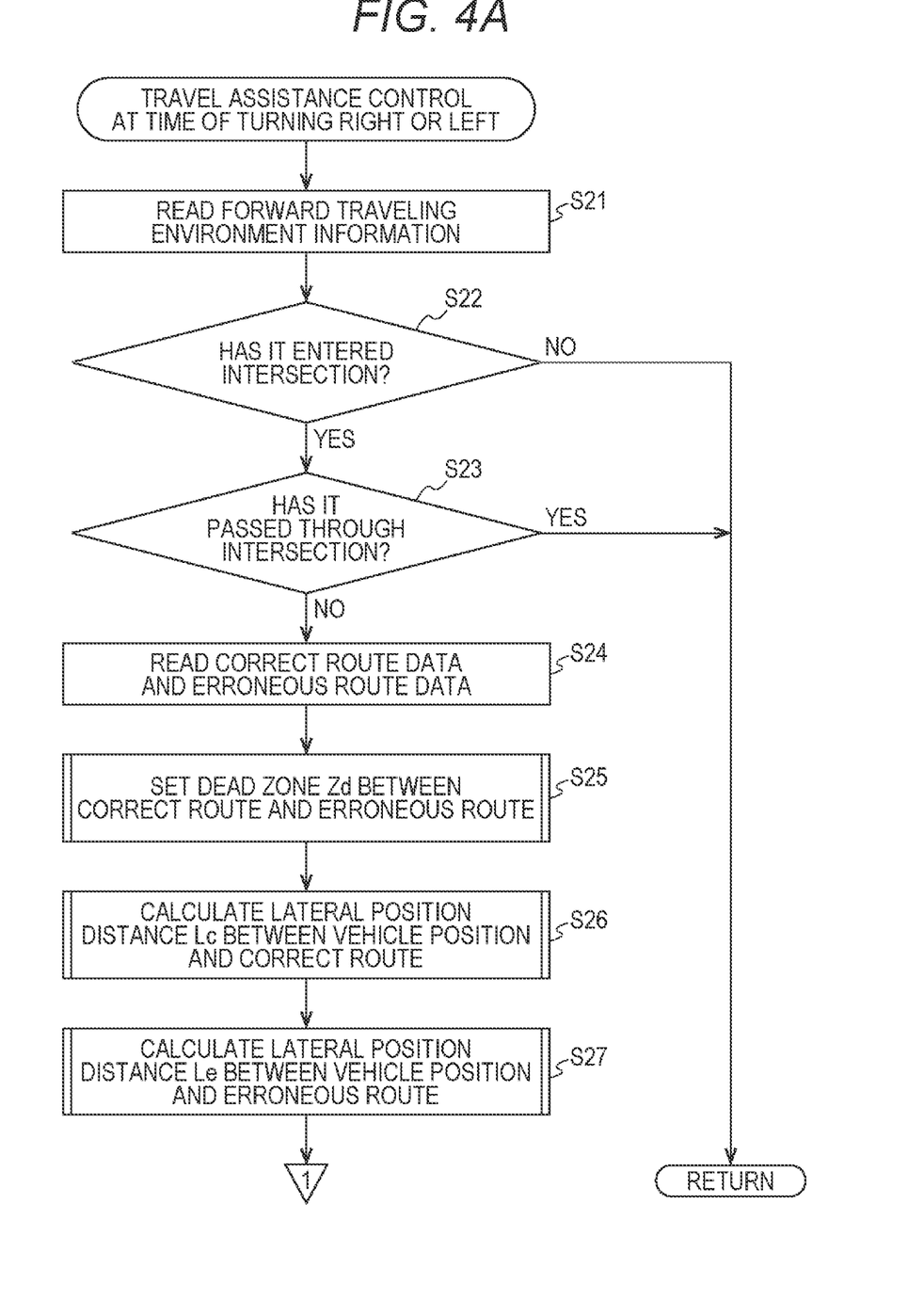
FIG. 4A is a flowchart (part 1) illustrating a travel assistance control routine at a time of turning right or left.
Figure 4B:
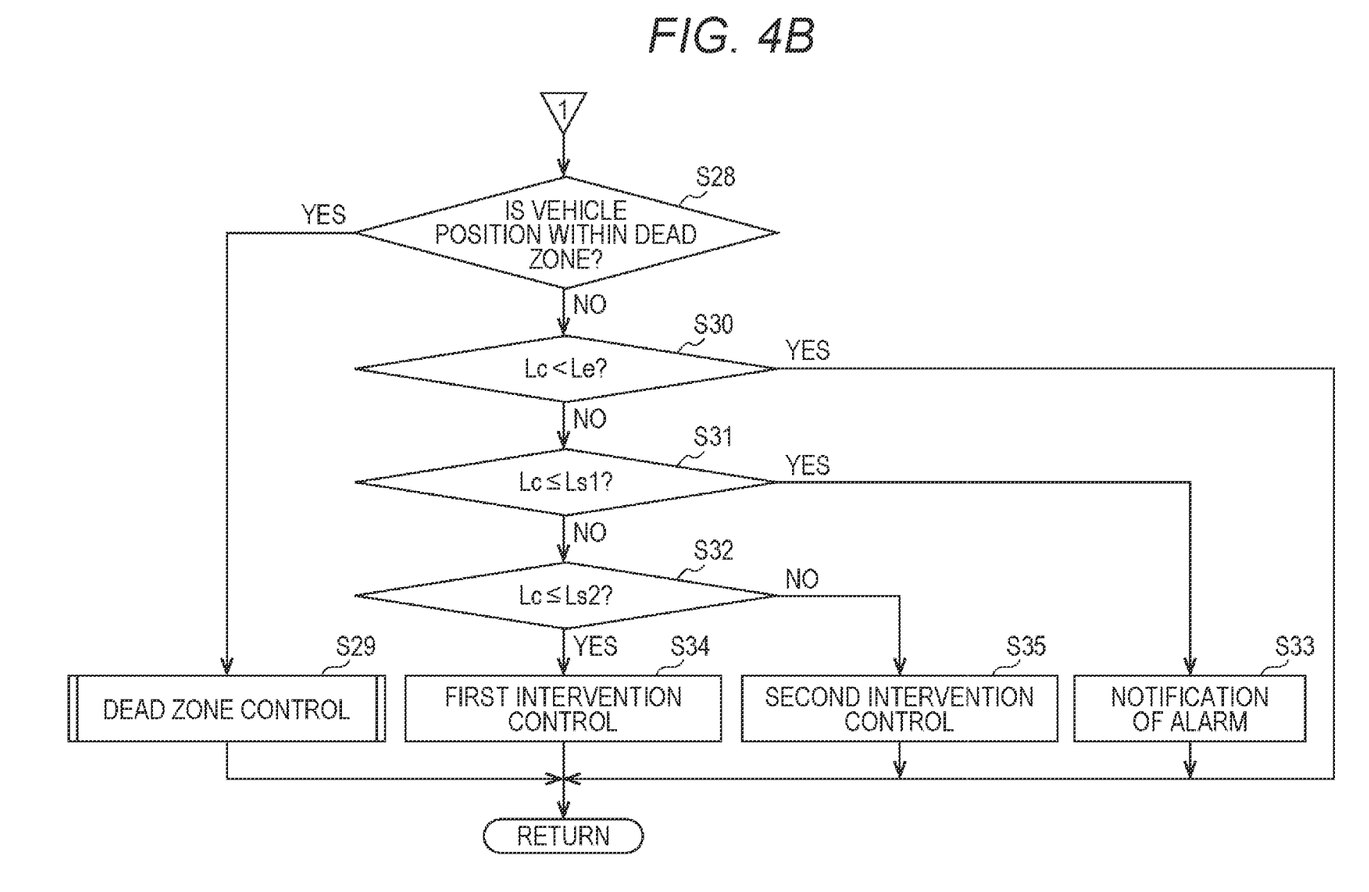
FIG. 4B is a flowchart (part 2) illustrating the travel assistance control routine at the time of turning right or left.

The data of the correct route Rc and the erroneous route Re is read by the travel assistance control routine at the time of turning right or left illustrated in FIGS. 4A and 4B. Note that the above-described travel route generation routine at the time of turning right or left is executed at every predetermined calculation cycle until immediately before the vehicle M enters the intersection. Thus, the data of the correct route Rc and the data of the erroneous route Re stored in the nonvolatile memory are sequentially updated with the latest data.

Next, the travel assistance control routine at the time of turning right or left illustrated in FIGS. 4A and 4B will be described. In this routine, first, in step S21, the forward traveling environment information of the vehicle M is read. The forward traveling environment information is acquired from the forward traveling environment information recognized by the forward traveling environment recognizer 26d of the camera unit 26. Alternatively, the forward traveling environment information may be acquired with reference to the high-precision road map information stored in the road map database 13 from the relationship between the target route set by the travel route/target route setting calculator 12b of the map locator calculator 12 and the current vehicle position.

Figure 7:
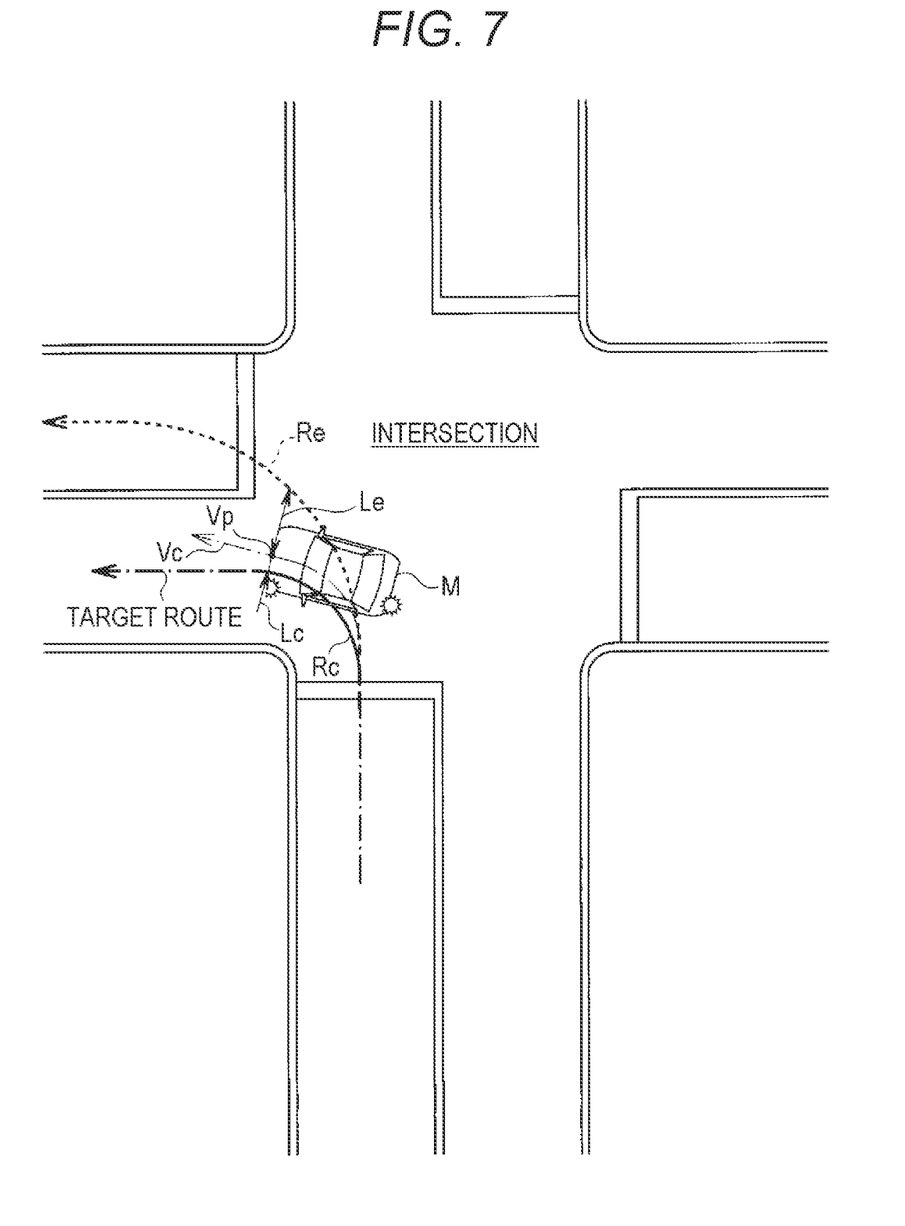
FIG. 7 is a diagram illustrating a vehicle position with respect to the correct route and the erroneous route generated at the time of turning left.
Figure 9:
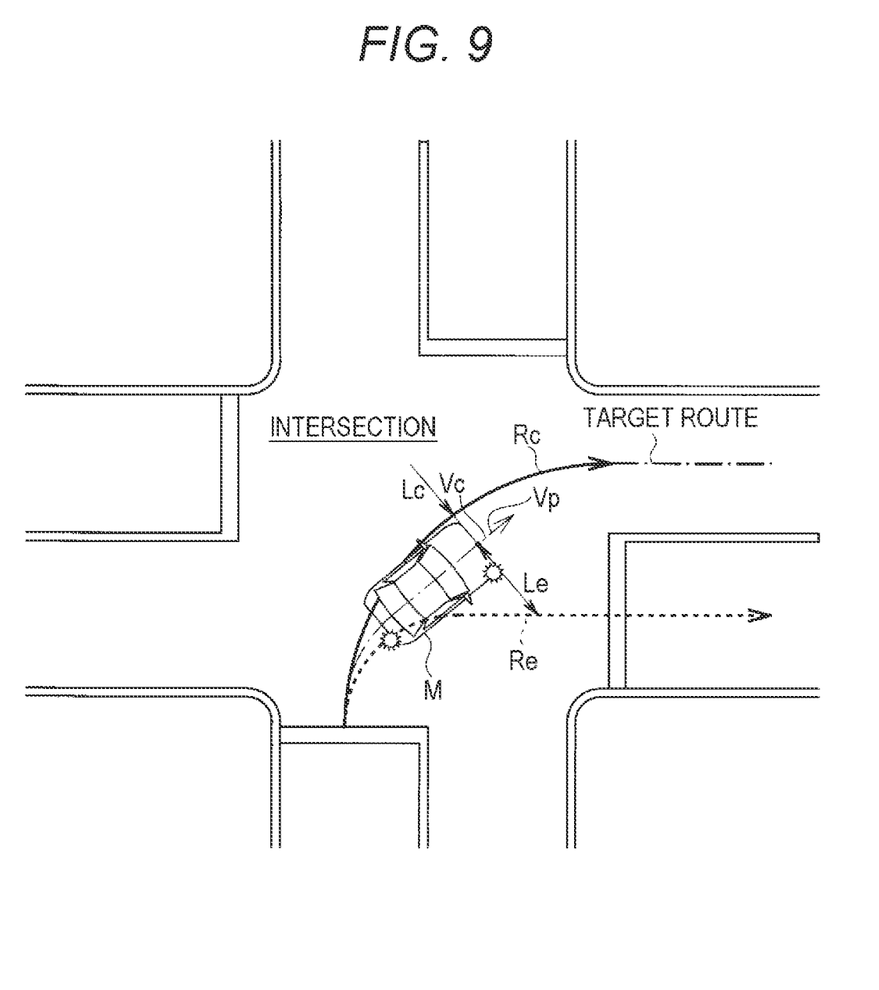
FIG. 9 is a diagram illustrating a vehicle position with respect to the correct route and the erroneous route generated at the time of turning right.

Next, the process proceeds to step S22, and based on the forward traveling environment information read in step S21, it is checked whether the vehicle M has entered the intersection. Then, when the vehicle has not yet entered the intersection, the routine is terminated. On the other hand, when the vehicle M has entered the intersection, the process proceeds to step S23. Note that, in the present embodiment, as illustrated in FIGS. 7 and 9, a vehicle position Vp indicates a front end of the vehicle M and the center in the vehicle width direction. Therefore, the track of the vehicle position Vp becomes the vehicle traveling route Vc.

When the process proceeds to step S23, it is checked whether the vehicle M (more precisely, the vehicle position Vp) has passed through the intersection based on the forward traveling environment information read in step S21.

Then, when it is determined that the vehicle M is traveling in the intersection, the process proceeds to step S24. On the other hand, when it is determined that the vehicle has passed through the intersection, the routine is terminated. Note that whether the vehicle has passed through the intersection may be determined by, in addition to the forward traveling environment information, for example, a state in which the steering angle is turned back to zero (deg), or by detecting the vehicle position Vp from the road map information, or by detecting OFF of the indicator switch.

Figure 6:
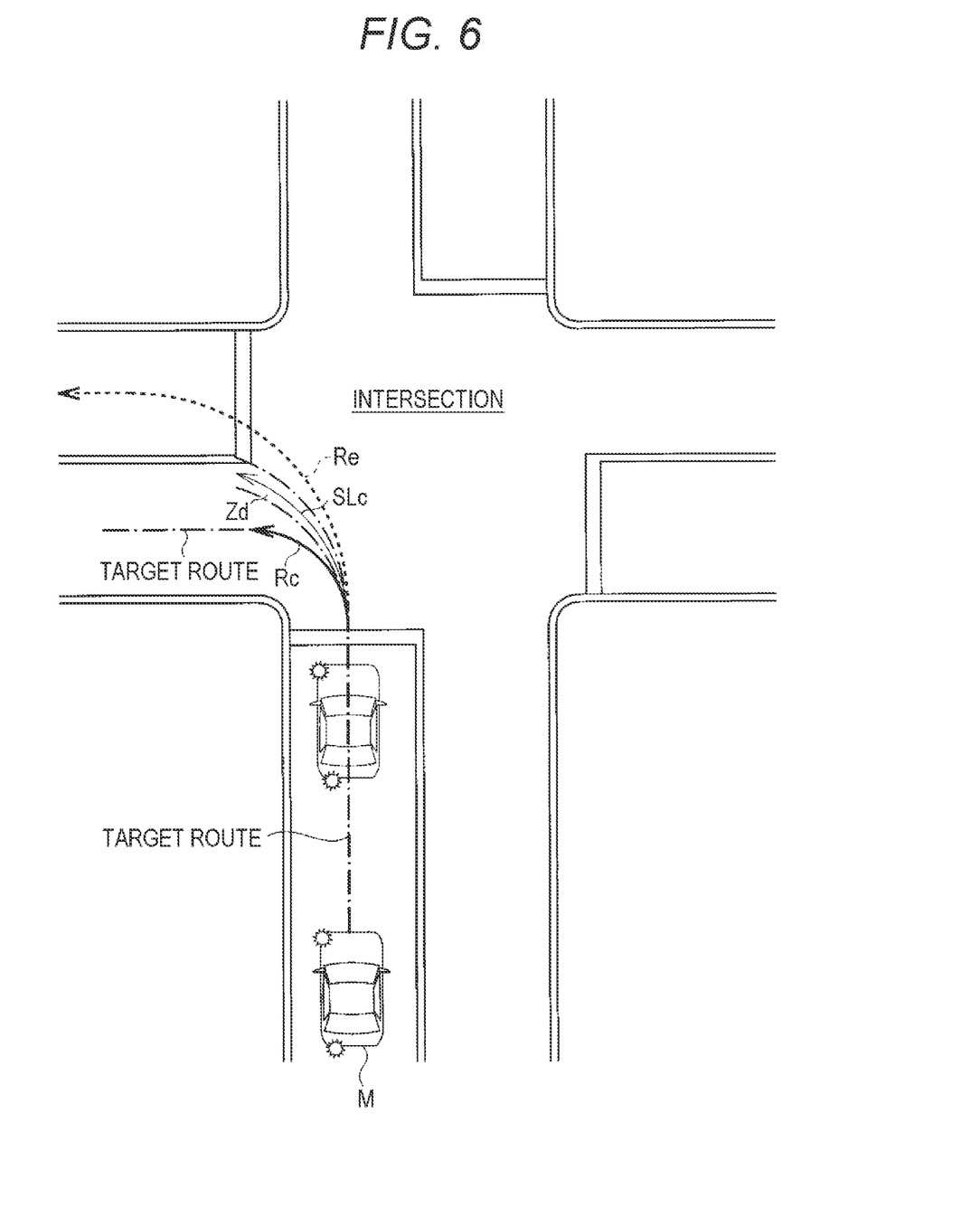
FIG. 6 is a diagram of a state in which a correct route and an erroneous route are generated at a time of turning left.
Figure 8:
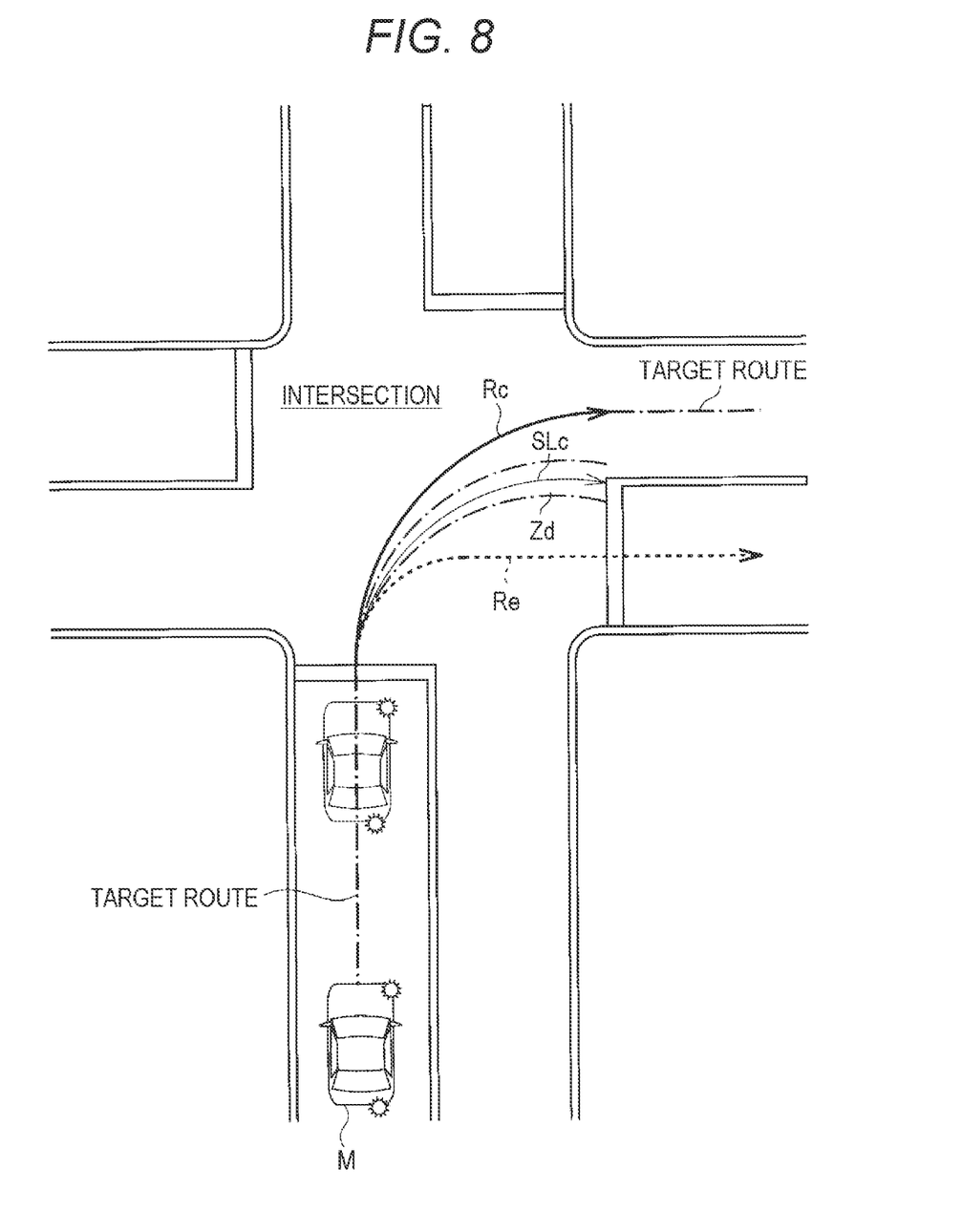
FIG. 8 is a diagram of a state in which a correct route and an erroneous route are generated at the time of turning right.

In step S24, the latest data of the correct route Rc and the erroneous route Re stored in the nonvolatile memory is read. Next, the process proceeds to step S25, and a dead zone Zd is set between the correct route Rc and the erroneous route Re. As illustrated in FIGS. 6 and 8, in the center of the dead zone Zd, the center of the shortest distance coupling the correct route Rc and the erroneous route Re is set as a median value, and this median value is set as a route threshold value SLc. In one embodiment, the process in step S25 may serve as a process performed by a "dead zone setter".

Dead zone widths are set on both sides of the route threshold value SLc as indicated by alternate long and short dash lines in the drawing. The dead zone widths are each set with reference to a table set in advance to widths that increase as the shortest distance coupling the correct route Rc and the erroneous route Re increases, and the inside of the dead zone widths are the dead zone Zd. Since the route threshold value SLc is set at the center between the correct route Rc and the erroneous route Re, the route threshold value SLc is located far from both the routes Rc and Re. Therefore, if the vehicle position Vp is located far from both the correct route Rc and the erroneous route Re, the vehicle position Vp is within the dead zone Zd.

Next, the routine proceeds to step S26, and a lateral position distance (correct-route-side lateral position distance) Lc between the vehicle position Vp and the correct route Rc generated at the intersection is calculated. The routine proceeds to step S27, and a lateral position distance (erroneous-route-side lateral position distance) Le between the erroneous route Re generated at the intersection and the vehicle position Vp is calculated (See FIGS. 7 and 9). In one embodiment, the process in steps S26 and S27 may serve as a process performed by a "lateral position distance calculator".

The driving assistance control unit 21 performs feedback control for correcting a lateral deviation amount with respect to the target route so that the vehicle M travels along the target route. However, at the time of turning when turning right or left at the intersection, a deviation is likely to occur between the vehicle position Vp and the correct route Rc set at the intersection due to the influence of turning characteristics or the like different for each vehicle type.

Consequently, when the vehicle M travels in the lane of the destination of a right turn or a left turn at the intersection, the deviation amount from the target route becomes large, and it may be difficult to return to the target route by the normal feedback control. Accordingly, it is necessary to determine whether traveling is possible when the vehicle M is caused to enter a road of a right turn or left turn destination while the deviation amount is large.

In step S27 and subsequent steps, whether it is possible to continue traveling by automated driving when the vehicle M enters the road of the right turn or left turn destination is determined based on the vehicle position Vp and the lateral position distances Lc and Le between the correct route Rc and the erroneous route Re.

First, in step S28, it is checked whether the vehicle position Vp is within the dead zone Zd. In one embodiment, the process in step S28 may serve as a process performed by a "dead zone determiner".

Then, when the vehicle position Vp is within the dead zone Zd, the process proceeds to step S29, and the dead zone control is executed and the routine is terminated. On the other hand, when the vehicle position Vp is out of the dead zone Zd, the process proceeds to step S30.

Figure 5:
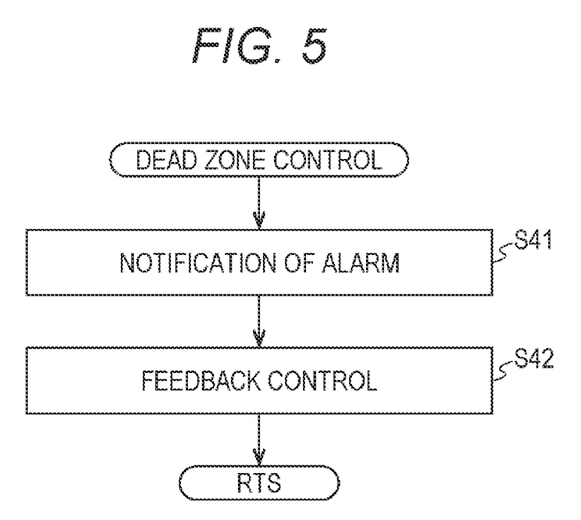
FIG. 5 is a flowchart illustrating a dead zone control subroutine.

The dead zone control in step S29 is executed in accordance with a dead zone control subroutine illustrated in FIG. 5. In this subroutine, first, in step S41, the driving assistance control unit 21 activates the notification device 34 to notify the driver of an alarm indicating that the vehicle position Vp is deviated from the correct route Rc.

Next, the process proceeds to step S42 to execute normal feedback control, and the routine is terminated. In the dead zone Zd, the lateral position distances Lc and Le between the vehicle position Vp, which will be described later, and the correct route Rc and the erroneous route Re are not compared, so that control hunting can be prevented.

On the other hand, when the process proceeds from step S28 to step S30, the correct-route-side lateral position distance Lc is compared with the erroneous-route-side lateral position distance Le. Then, when the correct-route-side lateral position distance Lc is shorter than the erroneous-route-side lateral position distance Le (Lc<Le), that is, when it is determined that the vehicle position Vp is on the correct route Rc side with respect to the dead zone Zd, the routine is terminated. When the vehicle position Vp is on the correct route Rc side with respect to the dead zone Zd, it is determined that the vehicle position Vp can be converged by feedback control in normal steering control with respect to a target route set to a lane of a right turn or left turn destination, and the routine is terminated without executing forced intervention such as steering control. Consequently, normal feedback control is continued in the automated driving.

In comparing the correct-route-side lateral position distance Lc with the erroneous-route-side lateral position distance Le, it becomes clear whether the vehicle position Vp is closer to the correct route Rc or the erroneous route Re by the dead zone Zd, and control hunting near the route threshold value SLc can be prevented. In one embodiment, the process in step S30 may serve as a process performed by a "lateral position distance comparator".

On the other hand, when the correct-route-side lateral position distance Lc is longer than the erroneous-route-side lateral position distance Le (Lc>Le), that is, when it is determined that the vehicle position Vp is closer to the erroneous route Re than the dead zone Zd, the process proceeds to step S31. In step S31, the correct-route-side lateral position distance Lc is compared with a first threshold value Ls1 as an alarm threshold value. The first threshold value Ls1 is set at a position not largely deviated from the dead zone Zd along the dead zone width set on the side of the erroneous route Re of the dead zone Zd.

Then, when Lc>Ls1, it is determined that the vehicle position Vp is on the erroneous route Re side, and the process proceeds to step S32. On the other hand, when Lc≤Ls1, it is determined that the vehicle position Vp does not greatly deviate from the dead zone Zd toward the erroneous route Re, and the process branches to step S33. In step S33, the vehicle M determines that the vehicle M can return to the dead zone Zd by feedback control in normal steering control, and the driving assistance control unit 21 activates the notification device 34 to notify the driver of an alarm and exits the routine. The content of the notification is, for example, that the vehicle position Vp deviates from the target route set to the lane of the right turn or left turn destination when entering the lane of the right turn or left turn destination from the intersection.

In step S32, the correct-route-side lateral position distance Lc is compared with the second threshold value Ls2 as an intervention threshold value. The second threshold value Ls2 is set at a position relatively separated from the dead zone Zd along the dead zone width set on the side of the erroneous route Re of the dead zone Zd. In one embodiment, the process in steps S30 to S32 may serve as a process performed by a "control determination comparator".

Then, when Lc≤Ls2, it is determined that the vehicle position Vp does not greatly deviate from the dead zone Zd, and the process proceeds to step S34. On the other hand, when Lc>Ls2, it is determined that the vehicle position Vp greatly deviates from the dead zone Zd, and the process branches to step S35.

When the process proceeds to step S34, the driving assistance control unit 21 executes first intervention control and terminates the routine. The first intervention control executed by the driving assistance control unit 21 first activates the notification device 34 to notify the driver of the forced intervention of the control, and then transmits a loose (weak) brake driving signal to the brake driving unit 31 and a steering signal to the EPS driving unit 32. Then, the traveling direction of the vehicle M is corrected to the dead zone Zd direction while decelerating in the intersection. Note that, in this case, in order to prevent the control hunting, the driving assistance control unit 21 continues the first intervention control until the correct-route-side lateral position distance Lc crosses the first threshold value Ls1 and moves to the dead zone Zd side. In one embodiment, the processes in step S34 and step S35 to be described later may serve as a process performed by an "intervention controller".

On the other hand, when the process branches to step S35, the driving assistance control unit 21 executes the second intervention control and terminates the routine. The second intervention control executed by the driving assistance control unit 21 first activates the notification device 34 to notify the driver that the forced intervention of the control is to be executed. Next, a stronger brake driving signal is transmitted to the brake driving unit 31, and the steering signal is transmitted to the EPS driving unit 32. Note that, in this case, in order to prevent the control hunting, the driving assistance control unit 21 continues the second intervention control until the correct-route-side lateral position distance Lc crosses the second threshold value Ls2 and moves to the first threshold value Ls1 side.

Consequently, the traveling direction of the vehicle M is corrected to the direction of the dead zone Zd while greatly decelerating in the intersection, and it is possible to prevent the vehicle M from entering the opposite lane side in the intersection.

As described above, when the vehicle M intends to turn right or left at an intersection by automated driving, the driving assistance control unit 21 of the present embodiment first acquires the road information of a right turn or left turn destination, and sets a target traveling route where the vehicle M travels to a travel lane of the right turn or left turn destination based on the road information. A route is set at the center of the opposite lane of the right turn or left turn destination. Then, the correct route Rc is set in the intersection by coupling an end point of the target traveling route where the current vehicle M travels and enters the intersection and an end point of the target traveling route set as a lane of a right turn or left turn destination with the curvature between two points. The erroneous route Re is set in the intersection by coupling the end point of the target traveling route where the current vehicle M travels and enters the intersection and the end point of the route set as the opposite lane with the curvature between two points.

Then, when it is determined that the vehicle position Vp is shifted to the erroneous route Re side at the intersection, the driving assistance control unit 21 drives the EPS driving unit 32 to perform steering control so as to return the vehicle position Vp to the correct route Rc side. Thus, it is possible to perform appropriate steering control depending on the vehicle position in the intersection. Further, when it is determined that the vehicle M cannot be returned to the correct route side only by steering intervention, the vehicle M is decelerated by operation of the brake driving unit 31 to prevent the vehicle M from entering the opposite lane side.

Note that the disclosure is not limited to the above-described embodiment, and for example, the driving assistance control unit 21 can also be applied to a case where only steering assistance at the time of traveling is performed.

According to the disclosure, when it is determined that there is an intersection in front of a vehicle based on environment information acquired by an environment information acquisitor, it is determined whether the vehicle turns right or left at the intersection. When it is determined that the vehicle turns right or left at the intersection, a correct route coupled to a target route generated at a destination of the right or left turn and an erroneous route coupled to an opposite lane of the right or left turn are generated at the intersection before the vehicle enters the intersection. In addition, a correct-route-side lateral position distance to the route and an erroneous-route-side lateral position distance to the erroneous route in a vehicle width direction from the position of the vehicle are calculated and compared. When it is determined that the correct-route-side lateral position distance is longer than the erroneous-route-side lateral position distance, the correct-route-side lateral position distance is compared with a preset intervention threshold value. Then, when it is determined that the correct-route-side lateral position distance is shorter than the intervention threshold value, loose intervention control is executed, and when it is determined that the correct-route-side lateral position distance is longer than the intervention threshold value, a strong intervention control is executed to return a traveling direction of the vehicle to the correct route side. Thus, appropriate intervention control can be performed depending on the vehicle position in the intersection.

The invention claimed is:

1. A driving assistance apparatus for a vehicle, the driving assistance apparatus comprising:
an environment information acquisitor comprising a camera and being configured to acquire environment information in front of the vehicle; and
one or more processors and one or more memories storing one or more programs for causing the one or more processors to:
estimate a position of the vehicle on a road;
set a target route for the vehicle;
cause the vehicle to travel along the target route;
determine whether there is an intersection in front of the vehicle based on the environment information acquired by the environment information acquisitor;
determine whether the vehicle turns right or left at the intersection when it is determined that there is the intersection;
when it is determined that the vehicle turns right or left, generate a correct route and an erroneous route at the intersection before the vehicle enters the intersection, the correct route being coupled to the target route generated at a destination of a right turn or a left turn, the erroneous route being coupled to an opposite lane of the destination of the right turn or the left turn, wherein the erroneous route is generated by setting a route at the center of the opposite lane of the right turn or left turn destination and coupling an end point of the target route where the vehicle enters the intersection and an end point of the route set at the center of the opposite lane with curvature between the two end points;
calculate a correct-route-side lateral position distance from the position of the vehicle to the correct route in a vehicle width direction of the vehicle and an erroneous-route-side lateral position distance from the position of the vehicle to the erroneous route in the vehicle width direction;
compare the correct-route-side lateral position distance and the erroneous-route-side lateral position distance;
compare the correct-route-side lateral position distance with a preset intervention threshold value when it is determined that the correct-route-side lateral position distance is longer than the erroneous-route-side lateral position distance;
execute a first intervention control by activating a notification device to notify a driver, transmitting a first brake driving signal to a brake driving unit, transmitting a steering signal to an electric power steering (EPS) driving unit, and correcting a traveling direction of the vehicle while decelerating in the intersection when the it is determined that the correct-route-side lateral position distance is shorter than the intervention threshold value; and
when it is determined that the correct-route-side lateral position distance is longer than the intervention threshold value, execute a second intervention control by activating the notification device, transmitting a second brake driving signal, stronger than the first braking signal, to the brake driving unit, transmitting a steering signal to the EPS driving unit, and correcting the traveling direction while greatly decelerating to prevent the vehicle from entering the opposite lane side to return a traveling direction of the vehicle to a side of the correct route.

2. The driving assistance apparatus for the vehicle according to claim 1, wherein the position of the vehicle indicates a front end of the vehicle and a center in the vehicle width direction.

3. The driving assistance apparatus for the vehicle according to claim 1, wherein
the one or more processors has an alarm threshold value shorter than the intervention threshold value, and
the one or more processors is configured to refrain from executing the intervention control and execute only an alarm when it is determined that the correct-route-side lateral position distance is shorter than the alarm threshold value.

4. The driving assistance apparatus for the vehicle according to claim 1, wherein the one or more memories store one or more programs for causing the one or more processors to:
set a dead zone between the correct route and the erroneous route;
determine whether the position of the vehicle is in the dead zone; and
when it is determined that the position of the vehicle is in the dead zone, refrain from comparing the correct-route-side lateral position distance with the erroneous-route-side lateral position distance.

5. The driving assistance apparatus for the vehicle according to claim 4, wherein the dead zone is set at a center of a shortest distance coupling the correct route and the erroneous route.

6. A driving assistance apparatus for a vehicle, the driving assistance apparatus comprising circuitry configured to:
acquire environment information in front of the vehicle,
estimate a position of the vehicle on a road,
set a target route for the vehicle,
cause the vehicle to travel along the target route,
determine whether there is an intersection in front of the vehicle,
upon determining that there is the intersection, determine whether the vehicle turns right or left at the intersection,
upon determining that the vehicle turns right or left, generate a correct route and an erroneous route at the intersection before the vehicle enters the intersection, the correct route being coupled to the target route generated at a destination of a right turn or a left turn, the erroneous route being coupled to an opposite lane of the destination of the right turn or the left turn, wherein the erroneous route is generated by setting a route at the center of the opposite lane of the right turn or left turn destination and coupling an end point of the target route where the vehicle enters the intersection and an end point of the route set at the center of the opposite lane with curvature between the two end points,
calculate a correct-route-side lateral position distance from the position of the vehicle to the correct route in a vehicle width direction of the vehicle and an erroneous-route-side lateral position distance from the position of the vehicle to the erroneous route in the vehicle width direction,
compare the correct-route-side lateral position distance and the erroneous-route-side lateral position distance,
upon determining that the correct-route-side lateral position distance is longer than the erroneous-route-side lateral position distance, compare the correct-route-side lateral position distance with a preset intervention threshold value,
upon determining that the correct-route-side lateral position distance is shorter than the intervention threshold value, execute a first intervention control by activating a notification device to notify a driver, transmitting a first brake driving signal to a brake driving unit, transmitting a steering signal to an electric power steering (EPS) driving unit, and correcting a traveling direction of the vehicle while decelerating in the intersection, and
upon determining that the correct-route-side lateral position distance is longer than the intervention threshold value, execute a second intervention control by activating the notification device, transmitting a second brake driving signal, stronger than the first braking signal, to the brake driving unit, transmitting a steering signal to the EPS driving unit, and correcting the traveling direction while decelerating to prevent the vehicle from entering the opposite lane side to return a traveling direction of the vehicle to a side of the correct route.

7. The driving assistance apparatus for the vehicle according to claim 6, wherein the position of the vehicle indicates a front end of the vehicle and a center in the vehicle width direction.

8. The driving assistance apparatus for the vehicle according to claim 6, wherein
the circuitry has an alarm threshold value shorter than the intervention threshold value, and
the one or more processors is configured to refrain from executing the intervention control and execute only an alarm when it is determined that the correct-route-side lateral position distance is shorter than the alarm threshold value.

9. The driving assistance apparatus for the vehicle according to claim 6, wherein the circuitry is configured to:
set a dead zone between the correct route and the erroneous route;
determine whether the position of the vehicle is in the dead zone; and
when it is determined that the position of the vehicle is in the dead zone, refrain from comparing the correct-route-side lateral position distance with the erroneous-route-side lateral position distance.

10. The driving assistance apparatus for the vehicle according to claim 9, wherein the dead zone is set at a center of a shortest distance coupling the correct route and the erroneous route.

* * * * *